United States Patent [19]

Nishikawa et al.

[11] Patent Number: 4,519,063

[45] Date of Patent: May 21, 1985

[54] PHONO PICKUP CARTRIDGE

[75] Inventors: Kazuo Nishikawa; Hiroyuki Ichino; Keniti Okura, all of Saitama, Japan

[73] Assignee: Pioneer Electric Corporation, Japan

[21] Appl. No.: 278,037

[22] Filed: Jun. 29, 1981

[30] Foreign Application Priority Data

Jul. 1, 1980 [JP] Japan ............................ 55-92457[U]

[51] Int. Cl.[3] ............................................... G11B 3/02

[52] U.S. Cl. ..................................... 369/172; 369/170

[58] Field of Search ............... 369/170, 171, 172, 173, 369/256

[56] References Cited

U.S. PATENT DOCUMENTS

| | | | |
|---|---|---|---|
| 2,103,361 | 12/1937 | Guedon | 369/172 |
| 2,809,842 | 10/1957 | Mueller | 369/256 |
| 3,060,281 | 10/1962 | Snepvangers | 369/170 |
| 3,574,944 | 4/1971 | Reynolds | 33/265 |
| 3,787,984 | 1/1974 | Bear et al. | 33/265 |
| 4,114,896 | 9/1978 | Okura | 369/171 |
| 4,276,635 | 6/1981 | Obata et al. | 369/256 |
| 4,310,917 | 1/1982 | Hansen et al. | 369/170 |
| 4,327,433 | 4/1982 | Okura et al. | 369/170 |

FOREIGN PATENT DOCUMENTS

| | | | |
|---|---|---|---|
| 2024057 | 1/1972 | Fed. Rep. of Germany | 369/256 |

*Primary Examiner*—Steven L. Stephan
*Attorney, Agent, or Firm*—Sughrue, Mion, Zinn, Macpeak, and Seas

[57] ABSTRACT

A moving-coil type phono pickup cartridge in which undesirable resonances are eliminated and a vibrating unit is maintained in alignment with a predetermined center position of a magnet unit. A first non-magnetic body has a mount portion and a support portion extending perpendicularly to the mount portion. The support portion has a longitudinal hole formed therein which is intersected by a slit. A screw tightens and loosens a vibrating unit disposed in the hole by adjusting the gap width of the slit. A magnet unit is secured with a screw to the first body with a center pole piece thereof confronting a center of coils of the vibrating unit.

17 Claims, 4 Drawing Figures

PHONO PICKUP CARTRIDGE

BACKGROUND OF THE INVENTION

The present invention relates to a support structure for a vibrating unit including a cantilever of a phono pickup cartridge.

In the prior art phono pickup cartridges, a support structure for supporting a vibrating unit, for example, in an MC type pickup cartridge, was constructed with an armature formed of a magnetic core with a coil wound therearound provided at a rear end of a cantilever. A suspension wire is provided along an extension of an axis of the cantilever, and the suspension wire is held and secured in a wire holder by adhesive, welding, or the like. The holder is then inserted into a hole formed in a pole piece which forms part of a magnetic circuit and is secured thereto by a screw or the like after adjustment of a damper pressure. The assembled units are mounted in a cartridge case by a resin filling or the like which, in turn, is mounted to a pickup arm.

FIG. 1 is a fragmentary perspective view of a prior art cartridge in which a pair of pole pieces 2 and 3 are mounted clamping a magnet 1. An armature 6 on which a coil is wound is secured to a rear end of a cantilever having at the other end a stylus 5. The cantilever 4 is secured to the rear pole piece 3 by a screw 7 through a wire holder and a suspension wire, a front end of which is coupled to the rear end of the cantilever 4. The magnetic unit, composed of the magnet 1 and pole pieces 2 and 3, supporting the vibrating unit including the cantilever 4 and the armature 6 is secured in a cartridge case 9 by synthetic resin. The cartridge case portion A is then connected to a pickup arm.

In such a construction, since the vibrating unit is pressed in one direction by a screw 7 and is secured through the suspension wire and the wire holder, there is a high probability that the overall vibrating unit when it is mounted will be offset from the center of the pole piece gap. Also, since the vibrating unit is secured by a single screw, the wire holder may have an inherent resonance. Furthermore, since the vibrating unit is supported with a synthetic resin which inherently has some compliance, an undesired resonance and accompanying degradation of sound quality inevitably result.

SUMMARY OF THE INVENTION

Overcoming the above noted defects, the present invention provides a support structure for a phono pickup cartridge in which a mount portion of a head base of the cartridge and a vibrating unit including a cantilever are coupled to each other to form a rigid integral structure, whereby generation of undesired resonances is prevented and the vibrating unit is secured in alignment with a predetermined center position.

DESCRIPTION OF THE PREFERRED EMBODIMENTS

Figure 1:
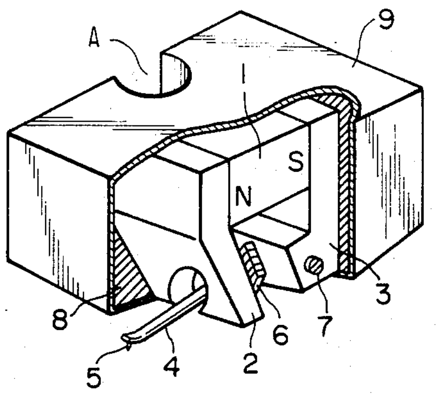
FIG. 1 PRIOR ART
FIG. 1 is a fragmentary perspective view of a prior art MC type phono pickup cartridge.
Figure 2:
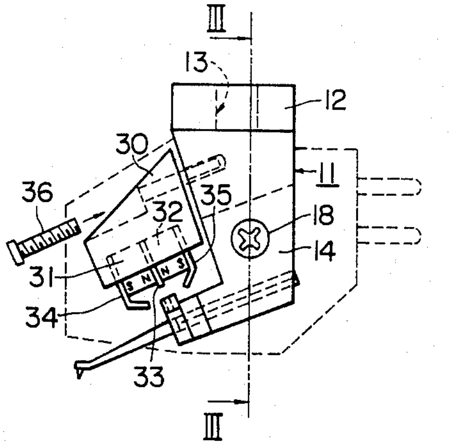
FIG. 2 is a side view of a phono pickup cartridge according to the present invention.
Figure 3:
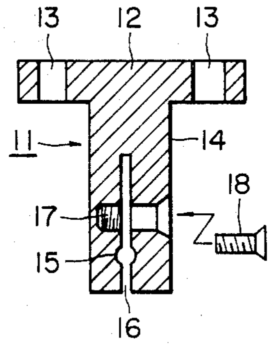
FIG. 3 is a cross-sectional view of the pickup cartridge taken along the line III—III.
Figure 4:
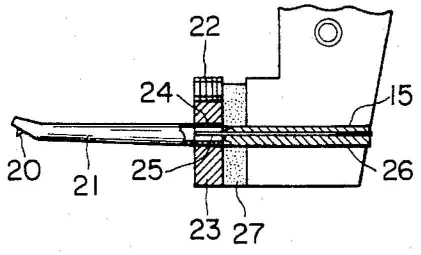
FIG. 4 is an enlarged view of the supporting portion supporting the vibrating unit of the phono pickup cartridge of the present invention.

The present invention will now be described in greater detail with reference to the accompanying drawings. In FIGS. 2 to 4, a body 11 is composed of a mount portion 12 having therein pickup arm mount holes 13 and a support portion 14 for supporting a vibrating unit constructed as described below. The mount holes 13 correspond to the cartridge case portion A shown in FIG. 1. The body 11 is made of rigid nonmagnetic material such as aluminum. A through-hole 15 through which a wire holder 26 described later is inserted is formed in an axial direction of a cantilever 21 in the support portion 14. A slit 16 is formed from a bottom of the support portion 14 with the slit 16 passing through the center line of the through-hole 15 and extending also in the axial direction of the cantilever along the entire overall length of the through-hole 15. A screw thread portion 17 in which is engaged screw 18 is provided so that the width of the slit 16 can be adjusted.

The vibrating unit is composed of the cantilever 21, a stylus 20 fixed at the free end of the cantilever, a holder 23 made of nonmagnetic material fixed to the other end of the cantilever, and two pickup coils 22 disposed at the outer periphery of the holder 23 arranged to form 45° angles with respect to a verticle plane. The cantilever 21 is coupled to a suspension wire 25 through a spacer 24 fixedly inserted into the cantilever 21. The suspension wire 25, which has a very small diameter, is inserted into a narrow hole in a wire holder 26 so as to vibratingly support the vibrating unit. The suspension wire 25 secured by pressing-fixing or welding.

The wire holder 26 is inserted into the through-hole 15 of the body 11. After the compression adjustment of a damper 27 to a predetermined pressure, the wire holder 26 is pressingly secured by contraction of the through-hole 15 by tightening the screw 18.

A magnet holder 30 has a magnet unit including a pair of magents like poles of which confront each other, a center pole piece 33 and two side pole pieces 34 and 35. The magnet holder 30 is secured to the body 11 by a screw 36 so that the center pole piece 33 is positioned in the vicinity of the center of the two pickup coils 22. It is preferable that the magnet holder 30 be made of aluminum or the like. The cartridge body is also fixed to the body 11.

With such a construction, the mount portion 12 and the support portion 14 of the body 11 are rigidly coupled integrally with each other and the wire holder 26 to which the suspension wire for supporting the vibrating unit is secured is pressingly secured in the through-hole 15 of the body 11 by the screw 18. Accordingly, there is no component between the portion fixed to the cartridge body and the supporting portion supporting the vibrating unit which can have an undesired resonance. Therefore, the quality of sound is not degraded, the design of the phono pickup cartridge in facilitated due to the elimination of unstable parts since the mount portion 12 connected to the cartridge body, the support portion 14 supporting the vibrating unit, the wire holder 26 and the like can be regarded as a single unit.

Also, since the wire holder 26 is not directly fixed by a screw, no recess formed by the screw is formed in the wire holder 26. Therefore, after performing fine adjustment by moving the wire holder axially, the tightening with the screw 18 can be accurately performed without making a recess. Furthermore, since the support portion through-hole 15 is narrowed toward the center thereof from both sides, the wire holder 26; and hence the overall vibrating unit can be supported at a predetermined center axis.

The preferred embodiment described relates to an MC type phono pickup cartridge although the invention can be applied to other types of cartridges as well.

What is claimed is:

1. A phono pickup cartridge comprising: a first body having a mount portion having at least one mount hole for mounting said first body to a pickup arm and a support portion for supporting a vibrating unit including a cantilever, said mount portion and said support portion being integral, a second hole being formed in said support portion, a vibrating supporting member being received in said second hole and being coupled to a rear end of said cantilever, a slit being provided in said support portion adjacent said second hole, and means for adjusting a width of said slit so that said vibrating supporting member can be pressingly secured in said second hole, said pickup cartridge further comprising first and second pickup coils coupled to said cantilever, and a magnet unit including a pair of magnets having like poles confronting each other, a center pole piece disposed between said like poles and first and second pole pieces disposed adjacent said magnets opposite said like poles confronting each other, said magnet unit being secured to said first body so that said center pole piece is positioned adjacent a center of said first and second pickup coils.

2. The phono pickup cartridge of claim 1 wherein said first body has a configuration which is T-shaped in cross section, said mount portion extending in a lateral direction to form a top section of said T-shaped configuration, said support portion extending from an intermediate portion of said mount portion in a direction perpendicular to said lateral direction, said mount portion having two of said mount holes which are disposed near opposite ends of said mount portion.

3. The phono pickup cartridge of claim 2, further comprising a magnet unit and a magnet unit holder for holding said magnet unit, and means for mounting and unmounting said magnet unit holder to said first body so that said magnet unit holder can be fixed to and separated from said first body.

4. The phono pickup cartridge of claim 3 wherein said mounting means comprises a screw.

5. The phono pickup cartridge of claim 1, further comprising a magnet unit and a magnet unit holder for holding said magnet unit, and means for mounting and unmounting said magnet unit holder to said first body so that said magnet unit holder can be fixed to and separated from said first body.

6. The phono pickup cartridge of claim 5 wherein the mounting means comprises a screw.

7. The phono pickup cartridge of claim 6 further comprising a holder for holding said pick-up coils and a damper interposed between said pick-up coil holder and said first body.

8. A phono pickup cartridge comprising: a first solid body having a mount portion having at least one mount hole for mounting said first body to a cartridge case and a support portion extending substantially perpendicularly to said mount portion, a longitudinal hole being formed in said support portion and a slit being formed in said support portion intersecting said longitudinal hole on opposite sides thereof and extending through the longitudinal extent of said longitudinal hole, a screw hole having screw threads being formed in said support portion intersecting said slit; a screw disposed in said screw hole for adjusting a gap width of said slit; a vibrating unit comprising a cantilever, a stylus fixed to a free end of said cantilever, a holder made of non-magnetic material fixed to an end of said cantilever opposite said stylus, first and second pickup coils disposed on an outer periphery of said holder arranged to form 45° angles with respect to a vertical plane, a wire holder extending from said end of said cantilever opposite said stylus having a narrow hole formed therein, and a suspension wire disposed through said narrow hole and secured to said cantilever; a damper member disposed adjacent said holder made of non-magnetic material on the side thereof opposite said stylus, said wire holder being disposed in said longitudinal hole in said support portion with said damper member abutting a front face of said support portion, said screw being tightened to secure said wire holder in said longitudinal hole; a magnetic unit comprising a pair of magnets having like poles confronting one another, a center pole piece disposed between said like poles, and two pole pieces disposed adjacent said magnets on ends thereof opposite said like poles; a second screw for securing said magnet unit to said first body wherein said center pole piece is positioned adjacent a center of said pickup coils.

9. The phono pickup cartridge of claim 8 wherein said magnet unit comprises a magnet holder made of aluminum for supporting said pair of magnets.

10. The phono pickup cartridge of claim 8 wherein said first body is made of aluminum.

11. A phono pickup cartridge comprising: a first body having a mount portion having at least one mount hole for mounting said first body to a pickup arm and a support portion for supporting a vibrating unit including a cantilever, said mount portion and said support portion being integral, a second hole being formed in said support portion, a vibrating supporting member being received in said second hole and be coupled to a rear end of said cantilever, a slit being provided in said support portion adjacent said second hole, and means for adjusting a width of said slit so that said vibrating supporting means can be pressingly secured in said second hole, said pickup cartridge further comprising first and second pickup coils coupled to said cantilever, a pickup coil holder for holding said pickup coils, and a damper interposed between said pickup coil holder and said first body, said pickup cartridge further comprising a magnet unit including a pair of magnets having like poles confronting each other, a center pole piece disposed between said like poles and first and second pole pieces disposed adjacent said magnets opposite said like poles confronting each other, said magnetic unit being secured to said first body so that said center pole piece is positioned adjacent a center of said first and second pickup coils.

12. The phono pickup cartridge of claim 11 wherein said slit extends in said support portion throughout a longitudinal extent of said second hole, said adjusting means comprising screw means threadedly engaged with said mount portion adjacent said slit for tightening said slit.

13. The phono pickup cartridge of claim 12 wherein said mount portion extends in a direction which is substantially perpendicular to a direction of extension of said support portion.

14. The phono pickup cartridge of claim 13 wherein said first body has a configuration which is T-shaped in cross section, said mount portion extending in a lateral direction to form a top section of said T-shaped configuration, said support portion extending from an intermediate portion of said mount portion, said mount portion having two of said mount holes which are disposed near opposite ends of said mount portion.

15. The phono pickup cartridge of claim 12 wherein said first body has a configuration which is T-shaped in cross section, said mount portion extending in a lateral direction to form a top section of said T-shaped configuration, said support portion extending from an intermediate portion of said mount portion in a direction perpendicular to said lateral direction, said mount portion having two of said mount holes which are disposed near opposite ends of said mount portion.

16. The phono pickup cartridge of claim 11, further comprising a magnet unit and a magnet unit holder for holding said magnet unit, and means for mounting and unmounting said magnet unit holder to said first body so that said magnet unit holder can be fixed to and separated from said first body.

17. The phono pickup cartridge of claim 11 wherein said mounting means comprises a screw.

* * * * *